UNITED STATES PATENT OFFICE.

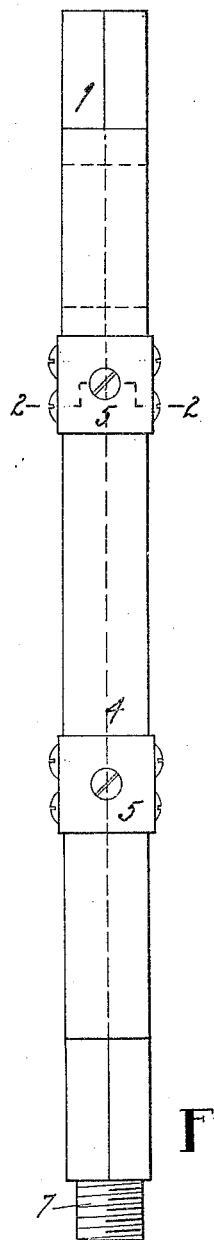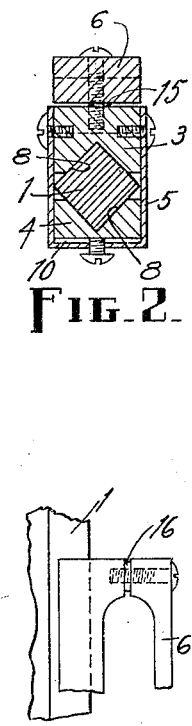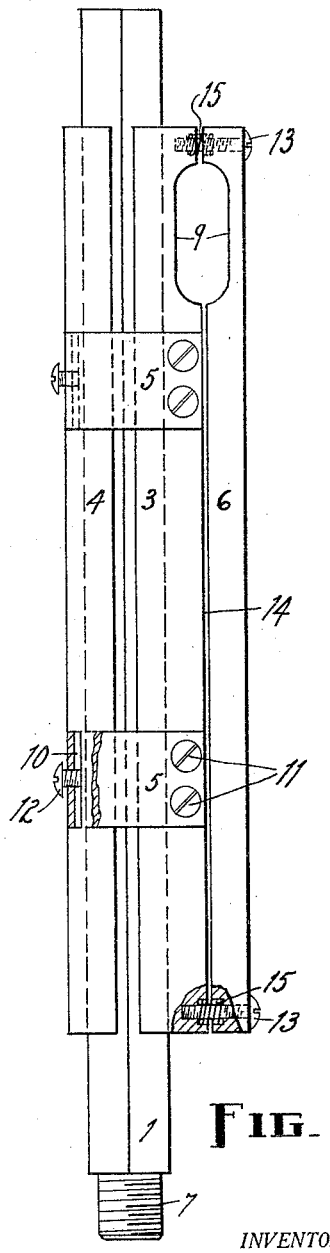

GEORGE W. CARY, OF GREENFIELD, MASSACHUSETTS.

SAW GUIDE.

1,417,973. Specification of Letters Patent. Patented May 30, 1922.

Application filed March 14, 1921. Serial No. 452,150.

*To all whom it may concern:*

Be it known that I, GEORGE W. CARY, a citizen of the United States of America, and a resident of Greenfield, in the county of Franklin and State of Massachusetts, have invented a new and useful Saw Guide, of which the following is a specification.

My invention relates to improvements in those parts of miter-boxes known as saw guides, and consists generally of a post that is angular in cross section, front and rear sliding members connected and held to such post by clamps which are provided with adjusting means, a front guide member between which and the front sliding member the saw is received and operates, and means whereby the width of the space or spaces for the saw may be regulated or increased or decreased in width, all as hereinafter set forth.

It is to be understood that two of these guides are provided for each miter-box, one in front and one behind, the saw operating through both.

The primary object of my invention is to provide a saw guide for miter-boxes which, while being comparatively simple and inexpensive in construction, is strong and durable, stable and capable of guiding a saw with great accuracy, has a sliding bearing that can be regulated to move with the utmost freedom, yet without vibration or lost motion laterally, and is adapted to accommodate saws of different thicknesses. Included in the advantages of this guide are means for taking up the parts to compensate for all wear.

Other objects and advantages will appear in the course of the following description.

I attain the objects and secure the advantages of my invention by the means illustrated in the accompanying drawings, in which—

Figure 1 is a rear elevation of a saw guide that embodies a practical form of my invention; Fig. 2, a cross section through said guide, taken on lines 2—2, looking down, in Fig. 1; Fig. 3, a side elevation of the guide, a portion of one of the clamps being broken away, also portions of the members between which the saw is received, and, Fig. 4, a fragmentary detail showing a slight modification of the spacer means for the members which form the saw slot.

Similar characters of reference designate similar parts throughout the similar views.

Referring to the drawings, it will be seen that the device, as thereby illustrated, comprises a post 1 which is angular, preferably square, in cross section, a bearing or slide consisting of front and back bars 3 and 4, respectively, and one or more connecting straps or clamps 5, with means to connect the parts, and an auxiliary or supplementary front bar 6 connected with but spaced from said first-named front bar by suitable means.

The post 1 has a screw-threaded base 7 to fit into the miter-box member upon which said post is mounted when the device is connected with a miter-box.

The bars 3 and 4 are generally rectangular in cross section, but they have longitudinal, V-shaped grooves 8—8 in adjacent sides to receive and fit two of the oppositely-disposed corner or angular portions of the post 1, as clearly shown in Fig. 2, the angle of each of said grooves being one of forty-five degrees in the present case. The bar 6 is also generally rectangular in cross section. There are oppositely-disposed, longitudinal recesses 9 in adjacent sides of the bars 3 and 6 near the top to form an opening for the back or head of a saw, which is usually thicker than the blade of such saw. In the back side of the rear bar 4 are slots 10 to receive the heels of the clamps 5, each of such slots being equal in length to the width of one of said clamps. The V-shaped grooves 8 are of insufficient depth to permit the bars 3 and 4 to contact with each other when in place on the post 1.

Each clamp 5 is an approximately U-shaped member of a size that enables the same to fit over and embrace the three exposed sides of the bar 4 and the two exposed sides of the bar 3, the heel of the clamp being received in one of the slots 10. A pair of screws 11 is employed to secure each clamp 5 to the bar 3, such screws passing through the side members or arms of the clamp into tapped engagement with said bar; and a single screw 12 is employed to assist in securing said clamp to the bar 4, said last-named screw being tapped into and through the heel of the clamp and bearing at the inner end against the innermost side of the slot 10 in which said heel is located.

By tightening and loosening the screws 12 the bars 3 and 4 are accordingly drawn closer together or permitted to separate further, and the degree of pressure of said bars on the post 1 is increased or decreased. Thus ready and convenient means is afforded for adjusting the bars 3 and 4 relative to each other and the post 1, for the purpose of regulating the same for frictional resistance between said bars and post, and also for taking up the parts to compensate for wear.

The bars 3 and 6 form the actual or direct guide for the saw, and the latter is fastened to the former by means of two screws 13 located near the ends of said bars. The opening at 9 between the bars 3 and 6 is for the head of a saw, as previously observed, and there must be a narrow slot, as 14, between said bars for the blade of said saw. The slot 14 is produced and maintained by introducing spacers between the bars 3 and 6. These spacers may consist of springs such as those represented at 15 in Figs. 2 and 3, or of washers one of which appears at 16 in Fig. 4.

The screws 13 pass through the bar 6 from the front and are tapped into the front side of the bar 3, and the springs 15 encircle said screws and have their terminals pocketed in adjacent portions of said bars. The tendency, therefore, of the springs 15 is to force the bar 6 away from the bar 3, and thus to provide and maintain the saw slot 14. Upon turning the screws 13 inwardly the width of the slot 14 is decreased, so also is the width of the opening at 9; and upon turning said screws outwardly the widths of said slot and opening are increased. Thus the bar 6 can be easily and quickly adjusted so that the saw slot and opening can be made to accommodate saws of different thickness, and take-up means is provided to compensate for any wear that may be produced by the rubbing of the saw on the parts.

In place of the spring 15 on each screw 13, the washer 16 may be used. The washer produces and maintains the saw slot and regulates the width of the opening at 9 as do the springs, but in order to adjust the parts, when the washers are employed, it is necessary partially or entirely to remove the screws 13, take off said washers, replace them with thicker or thinner washers, accordingly as it be desired to increase or decrease the width of said slot and opening, and reseat said screws. Thus it is seen that the washers do not afford as convenient a means for adjustment as do the springs.

The manner of using a saw in connection with this guide is similar to that of using a saw in connection with other types of saw guides, and need not, therefore, be described here.

More or less change in the shape, size, construction, and arrangement of some or all of the parts of this device may be made without departing from the spirit of my invention or exceeding the scope of what is claimed.

What I claim as my invention, and desire to secure by Letters Patent, is—

1. The combination, in a saw guide, with a post which is angular in cross section, of bars grooved to receive opposite angular portions of said post, a U-shaped clamp connecting said bars and rigidly fastened to one of the same, and a screw tapped into the heel of said clamp and bearing against the contiguous side of the other bar, one of said bars being provided with a saw-forming-slot member.

2. The combination, in a saw guide, with a post which is angular in cross section, of bars grooved to receive opposite angular portions of said post, a U-shaped clamp having its arms attached to one of said bars and its heel let into the other of said bars, and a screw tapped into said heel and bearing against the contiguous bar, one of said bars being provided with a saw-forming-slot member.

GEORGE W. CARY.

Witnesses:
PHILIP J. DARLINGTON,
WILLIAM C. CONANT.